United States Patent [19]

Haffner

[11] 4,078,764
[45] Mar. 14, 1978

[54] PLUMBING VALVE

[75] Inventor: Ralph Haffner, Edwardsburg, Mich.

[73] Assignee: Qest Products, Inc., Elkhart, Ind.

[21] Appl. No.: 709,628

[22] Filed: Jul. 29, 1976

[51] Int. Cl. ............................................. F16k 25/00
[52] U.S. Cl. .................................. 251/175; 251/251;
251/257; 285/334.2; 285/355
[58] Field of Search ............... 251/257, 258, 259, 260,
251/304, 309, 310, 311, 312, 192, 203, 175, 204,
251; 285/334.2, 334.3, 355

[56] References Cited

U.S. PATENT DOCUMENTS

| | | | |
|---|---|---|---|
| 1,548,533 | 8/1925 | Laderer | 285/334.2 |
| 2,349,081 | 5/1944 | Douglass | 285/334.2 |
| 2,534,577 | 12/1950 | Courtot | 251/258 |
| 2,775,471 | 12/1956 | Douglass | 285/334.2 |
| 3,136,336 | 6/1964 | Priesmeyer | 251/175 |
| 3,195,573 | 7/1965 | Daumy | 251/257 |
| 3,338,597 | 8/1967 | Mason | 285/334.3 |
| 3,386,700 | 6/1968 | Greene et al. | 251/175 |
| 3,645,493 | 2/1972 | Manorgian et al. | 251/310 |

FOREIGN PATENT DOCUMENTS 1,415,710  11/1975  United Kingdom ............... 251/257

Primary Examiner—Martin P. Schwadron
Assistant Examiner—G. L. Walton
Attorney, Agent, or Firm—Oltsch & Knoblock

[57] ABSTRACT

A plumbing valve having a plastic body with a lateral outlet and adapted for threaded connection with a metal pipe and including a resilient seal engaged and compressible upon connection of said valve body and pipe to maintain a seal therebetween incident to varying rates of expansion and contraction of said valve body and pipe with temperature changes. The valve has a rotatable actuator with an eccentric longitudinal part mounting a resilient tube having a portion pressed into contact with the cavity of the body to seal the outlet in one position and a second longitudinal part spaced from said concentric part and cooperating therewith to confine a part of said tube against radial expansion incident to liquid pressure from said metal supply pipe and retaining said tube against endwise displacement on said eccentric part.

7 Claims, 9 Drawing Figures

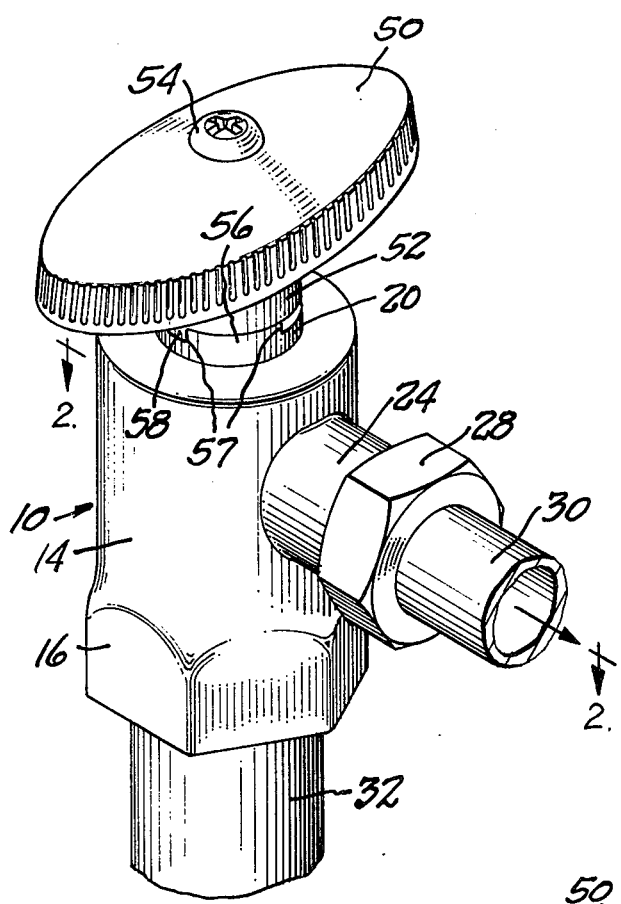
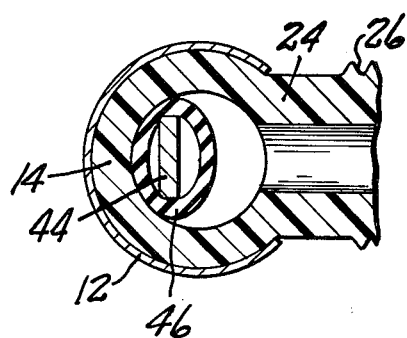
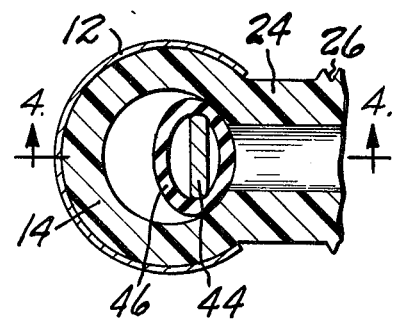
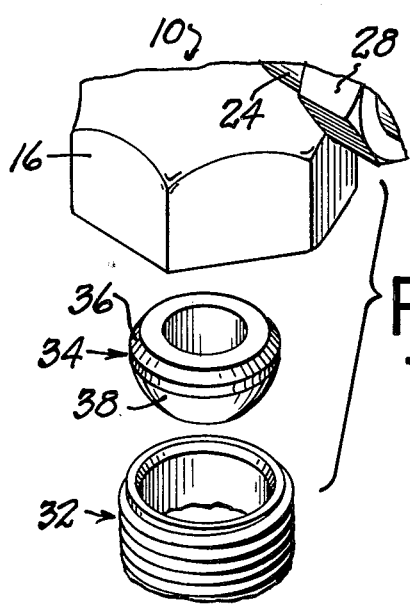
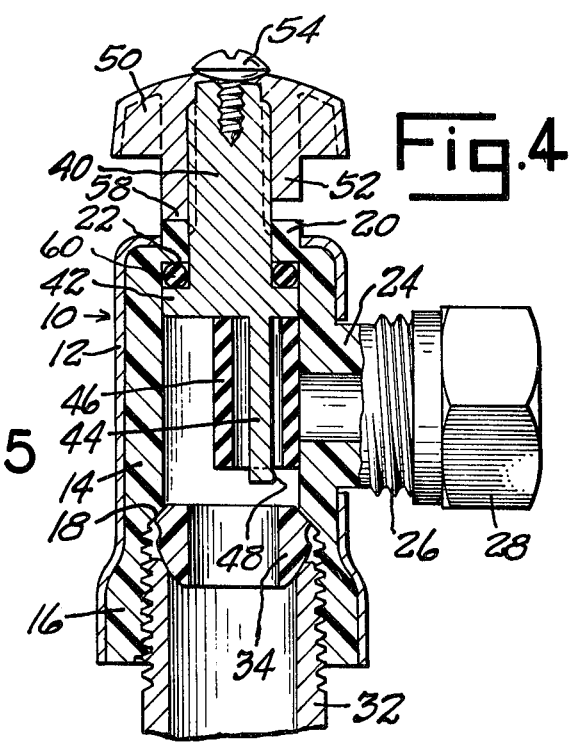

PLUMBING VALVE

SUMMARY OF THE INVENTION

This invention relates to improvements in plumbing valves and particularly to valves having plastic bodies.

Plumbing valves, such as shut-off valves installed between a main line and a branch line, are commonly formed of metal and are characterized by cast bodies and other parts which require machining, rendering the valves expensive and time-consuming to manufacture. Efforts to utilize the advantage of synthetic resin materials in the construction of valve bodies and parts to take advantage of the economies of production which synthetic resins offer have had limited success in the past because such valves have had certain limitations and defects. One problem with such valves has arisen from the difference in the rate of expansion and contraction inherent as between metal members, such as metal pipes, and plastic valve bodies connected to metal pipes. Thus it has been usual heretofore to rely upon application of a sealing compound at the threaded connection between a plastic valve body and a metal pipe, but it has been found that in the course of time leakage occurs at such joints incident to temperature changes despite the provision of the sealing compound.

Another problem which has been experienced with valves having plastic bodies and an eccentric member carrying a resilient tubular seal and rotatable between positions in which the seal spans an outlet in the side wall of the valve body and an open position spaced from the outlet has been that liquid pressure from the supply line, which is relied upon in part to effect sealing contact of the tubular seal member with the valve outlet or discharge port when the valve is in closed position, may also act detrimentally to prevent full opening of the valve when set in the "open" position. Also, in some instances, such valves have been ineffective to fully close the outlet in the "closed" valve position.

Other problems encountered with valves having plastic bodies with side wall outlets and valving elements including an eccentric rotatable member mounting a resilient tube adapted to span the outlet in the "closed" position have been that the resilient tube could not be restrained against displacement and assembly of the valve parts including the resilient tube and the eccentric member in operative relation to the valve body outlet could not be ensured and maintained.

It is the primary object of this invention to provide a plumbing valve with a plastic body which is so constructed as to meet and overcome the above and other problems previously encountered with plumbing valves having plastic bodies.

A further object is to provide a plumbing valve having a screw threaded connection to a supply pipe with novel sealing means between the pipe and the valve body effective to prevent leakage under varying temperature conditions causing relative expansion and contraction of connected metal and plastic parts.

A further object is to provide a valve having a rotatable eccentric member mounting a resilient sealing tube adapted to span an outlet in the side wall of the valve housing and so constructed as to ensure positive closing of the valve outlet when the valving element is in "closed" position by a combination of mechanical means and water pressure.

A further object is to provide a valve having a rotatable valving element mounting a resilient tubular sealing element eccentrically which is provided with means for retarding the action of water pressure internally of the resilient tube which might tend to restrict the discharge of the valve through the side opening when the valve is in "open" position.

A further object is to provide a valve of the character having an eccentric rotatable member mounting a resilient tubular sealing element which is provided with means to retain the sealing element against undesired displacement and to provide visible means for observing whether the component parts of the valve are in operative position during assembly thereof.

Other objects will be apparent from the following specification.

In the drawings

FIG. 1 is a perspective view of a valve forming one embodiment of this invention.

FIG. 2 is a sectional view taken on line 2—2 of FIG. 1 and illustrating one embodiment of the valve in "open" position.

FIG. 3 is a sectional view taken on line 2—2 of FIG. 1 but illustrating the valve in "closed" position.

FIG. 4 is an axial sectional view taken on line 4—4 of FIG. 3.

FIG. 5 is an exploded perspective view of the parts for effecting a seal between the valve body and a supply pipe.

DESCRIPTION OF THE PREFERRED EMBODIMENTS

Figure 6:
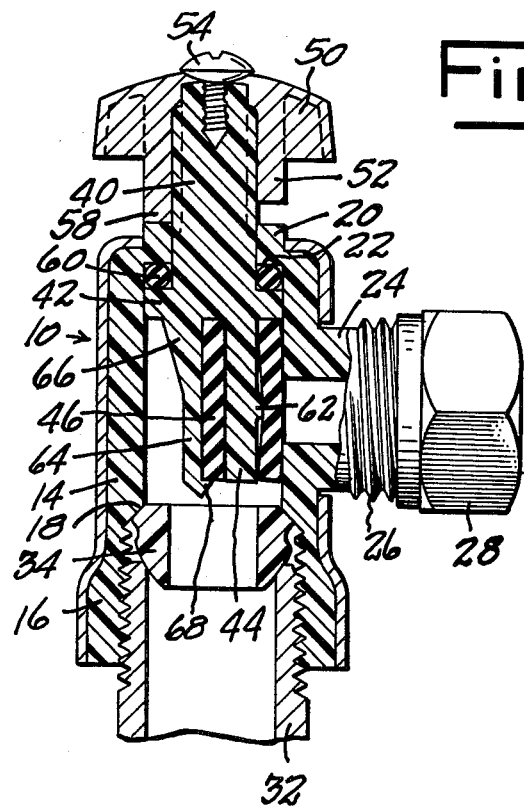
FIG. 6 is an axial sectional view similar to FIG. 4 but illustrating another embodiment of the invention.
Figure 9:
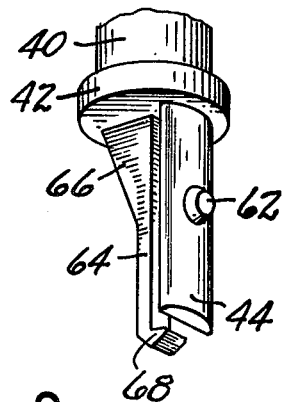
FIG. 9 is a fragmentary perspective view of a rotatable seal-mounting component of the valve of the construction illustrated in FIG. 6.

Referring to the drawings, and particularly to the embodiment of the invention illustrated in FIGS. 1 to 5, the numeral 10 designates a valve body which is formed by molding of a suitable thermoplastic material, such as ethylcellulose. One plastic found well suited for this use is known as Celcon M25. If desired, the body 10 may be encased by a metal sheath 12, although the use of a metal sheath is optional. The plastic body includes a tubular body part 14 having an internal screw threaded inlet end portion 16 of larger diameter than the intermediate portion of the body part 14 so as to provide an internal annular shoulder 18. The opposite end of the molded valve body includes a reduced diameter neck portion 20 which may project from the sheath 12 and which provides an annular internal shoulder 22 between the neck part 20 and the intermediate part 14 of the housing. A radially extending tubular part 24 provides an outlet communicating with the bore of the body 14 intermediate the length thereof and between and spaced from the shoulders 18 and 22. Outlet part 24 is provided with an external screw thread at 26 to which may be threaded a nut 28 forming part of a compression fitting (not shown) by means of which an outlet tube 30 may be connected in sealed relation to the outlet 24.

The valve body is connected with a metal or other supply tube 32 by a screw threaded connection thereof with the internal threaded inlet portion 16 of the valve housing. An annular seal member 34 formed of rubber, synthetic rubber or plastic material and preferably possessing at least limited properties of resilience, is mounted within the valve body to be clamped between the end portion of the supply tube 32 and the shoulder 18 of the valve housing. Seal member 34 has a bore of slightly smaller diameter than the bores of the supply tube 32 and the intermediate portion 14 of the housing and has an outer diameter greater than the bores or inner diameters of supply tube 32 and of the intermediate part of the housing 14. Thus as illustrated, the annular seal 34 preferably has a frusto conical end part 36 conforming to the frusto conical shape of the internal shoulder 18 of the valve housing, and at its opposite end has a frusto conical inlet part 38 adapted to project into the end of the supply tube 32 which preferably has an internal tapered mouth. The annular seal 34 is effective to prevent leakage between the supply tube 32 and the valve body 12,14 under all operative conditions, that is, throughout the range of temperatures to which the parts are subject and as a result of which temperature differences occur differing rates of expansion and contraction of the plastic valve body 10 and the metal supply tube 32.

A valve actuator is rotatable within the valve housing and the neck part thereof. This actuator is preferably molded of thermoplastic material, preferably of the same material of which the body part 14 is formed. The actuator has an elongated stem portion 40 having a snug rotative fit in the bore of the neck part 20 of the housing. At the inner end of the stem 40 is provided a concentric enlarged circular part 42 which preferably has a snug rotative fit within the bore of the intermediate portion 14 of the valve housing. The inner end of the actuator terminates in an eccentric longitudinally extending portion 44 which preferably is of a width greater than the diameter of the bore of the outlet portion 24 of the valve housing and whose longitudinal marginal portions are spaced a selected distance from the bore of the intermediate portion 14 of the valve housing. The length of the eccentric part 44 is such that the same extends past the bore of the tubular outlet 24 and terminates slightly spaced from the inner end of the annular seal 34.

The eccentric part 44 of the actuator is encircled by a resilient tube 46 formed of rubber, synthetic rubber or plastic material, and of a thickness slightly greater than the spacing of the margins of eccentric part 44 from the bore of the intermediate portion 14 of the housing, so that the resilient tube 46 is held in firm engagement with the bore of the intermediate portion 14 of the housing at the tube parts engaged by said margins throughout the length of the tube 46. Tube 46 preferably extends from the inner surface of the enlarged stem part 42 for substantially the full length of the eccentric part 44. The eccentric part 44 may be provided with a lateral projection 48 at its free end projecting beyond the innermost end of the resilient tube 46 and serving to engage portions of the inner end of the resilient tube 46 to retain the resilient tube 46 in operative position to span the bore of the outlet 24 in the "closed" position of the valve as shown in FIGS. 3 and 4.

A hand grip member 50 is mounted upon the projecting portion of the actuator stem 40, said handle having a tubular stem 52 which has telescopic fit with the actuator stem 40, said parts preferably being provided with cooperating spline portions (not shown) formed respectively by longitudinal interfitting exterior ribs on the outer end of the actuator stem and internal ribs at the bore of the handle stem 52, said interfitting ribs ensuring against relative rotation between the handle 50 and the actuator stem 40. The outer end of the handle 50 is provided with an annular inwardly projecting flange surrounding a central opening, which flange is adapted to be overlaid by the head of a securing screw 54 anchored in a screw threaded bore in the outer end of the actuator stem 40. The reduced neck part 20 of the valve body has a longitudinal projection 56 at its end defining a pair of spaced shoulders 57, and the end of the tubular handle stem 52 is provided with a longitudinal projection 58. The circumferential extent of the projections 56 and 58 and circumferential spacing of the shoulders 57 are preferably such that the handle 50 may be rotated only through 180 degrees between a position as illustrated in FIG. 3, which fully closes the outlet 24 of the valve housing, and the position illustrated in FIG. 2 which represents the fully opened position of the valve in which the eccentric part 44 is positioned at maximum displaced relation to the mouth of the opening of the discharge outlet 24 of the valve body.

The actuator, the handle and the valve body all constitute molded parts which can be injection molded to desired shape and configuration so as to require negligible machining or finishing before assembly of the parts. Assembly can be accomplished easily by first applying the tube 46 to the eccentric 44 of the adapter and applying a sealing ring, such as an 0-ring 60, around the neck of the adapter to seat or bear against the enlarged inner part 42 of the adapter. The adapter parts, when so assembled, can be inserted in the valve housing by longitudinal movement to a position as illustrated in which the stem 40 projects from the neck 20 valve housing. The handle 50 can then be mounted upon the stem 40 and secured thereto by the screw 54. The interconnection of the parts by means of tightening of the screw 54 serves to cause the projection 58 of the handle to abut the end of the neck 20 of the valve housing circumferentially displaced from projection 56 of the housing neck and assures desired longitudinal positioning of the actuator to define an annular chamber receiving the seal ring 60 and applying a squeeze to the seal 60 radially adequate to ensure against leakage around the actuator part 42 and between the stem 40 and the neck 20. Assembly of the valve is completed by then inserting the annular seal 34 to operative position, it being understood that the seal 34 will be of such outer dimension as to be retained in place in the valve housing in abutment with the internal shoulder 18 of the valve housing.

The thickness of the walls of the tube 46 will be such in relation to the width and dimensions of the eccentric part 44 of the actuator stem and the spacing thereof from the housing bore, and in relation to the position of the actuator stem in the valve housing in the closed valve position shown in FIG. 3, that in the closed position of the valve shown in FIG. 3 the portion of tube 46 adjacent the mouth of the valve inlet 24 will provide contact with the surface of the valve bore and provide a seal at the mouth of the passage of the valve outlet 24. The effectiveness of such a seal is enhanced by the pressure of liquid flowing from the supply pipe 32 and entering the open end of the tube 46 so as to tend to expand the tube 46 radially. Rotation of the actuator approximately 180° from the FIG. 3 position to the position shown in FIG. 2 moves the tube 46 clear of the outlet opening of the valve housing.

It will be observed that an effective seal between the valve housing and the supply pipe 32 is produced automatically by the simple act of threading the inlet end 16 of the valve housing upon the end of a supply pipe 32 to an extent causing firm abutment of the end of the supply tube 32 with the annular seal 34 and firm seating of the seal 34 at the internal shoulder 18 of the valve housing.

Figure 7:
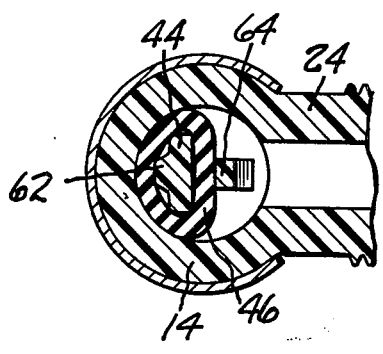
FIG. 7 is a transverse sectional view similar to FIG. 2 but illustrating the valve construction of FIG. 6 in "open" position.
Figure 8:
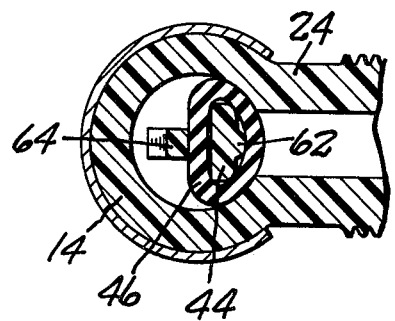
FIG. 8 is a sectional view similar to FIG. 3 illustrating the valve of the construction of FIG. 6 in sealing position.

A modified embodiment of the invention is illustrated in FIGS. 6, 7, 8 and 9 wherein parts similar to those previously described bear the same reference numerals. In this construction the eccentric part 44 of the actuator is preferably provided with a transverse convex curvature confronting the valve outlet 24 in the closed valve position so as to provide support of greater area for the portion of the resilient tube 46 interposed between the eccentric part and the valve housing. Also a protuberance 62 is preferably provided to extend from the eccentric part 44 in substantially centered relation to the bore of the outlet passage 24 in the closed position of the valve. The protuberance 62 is shallow, is preferably circular and smaller than the diameter of the bore of the valve outlet 24 and serves to provide increased insurance of continuous contact of resilient tube 46 with the valve housing at the mouth of the bore of the outlet 24 housing, as best seen in FIGS. 5 and 7.

The valve actuator is also provided with a longitudinally extending tube retainer 64 extending parallel and adjacent to the eccentric 44 at the side thereof opposite that from which protuberance 62 projects and of slightly greater length than the eccentric part 44. The retainer is preferably tapered at 66 for rigidity. The retainer 64 is spaced from eccentric 44 a distance equal to or slightly greater than the thickness of the resilient sealing tube 46 which is positioned between the eccentric 44 and the tube retainer 64 in the operative relation of the parts. The free projecting end of the retainer 64 preferably includes a lateral projection or hook portion 68 adapted to engage the end of the tubular sealing member 46 in the operative position of the parts so as to retain the resilient tube 46 against accidental displacement endwise or release from desired operative position upon the eccentric part 44. By this arrangement, the resilient sealing tube 46 is restrained against radial expansion incident to supply pressure to an extent which might tend to interfere with full opening of the valve in the FIG. 7 open valve position. At the same time, internal liquid pressure may be admitted into the tubular member to radially expand the portion of sealing tube 46 which confronts the valve outlet 24 so as to supplement the sealing action of the resilient tube 46 when in the closed position of the valve.

While the invention has been illustrated as being provided with a metal-clad plastic valve body, it will be understood that this construction is optional and that the plastic valve body does not require a metal casing.

While the preferred embodiments of the invention have been illustrated and described, it will be understood that changes in the construction within the scope of the appended claims may be made without departing from the spirit of the invention.

What I claim is:

1. A plumbing valve comprising
   a tubular valve body having an internally threaded enlarged portion at one end defining an annular internal shoulder, a reduced neck portion at its opposite end defining a second annular internal shoulder, and a lateral outlet passage between and spaced from said shoulders,
   a valve actuator rotatable in said valve body and having a stem projecting from said neck, said actuator including an enlarged circular portion in said body spaced from and confronting said second shoulder and an elongated longitudinal eccentric part positioned within said valve body with clearance,
   a resilient tube encircling said eccentric actuator part and having contact with two longitudinal portions of said actuator and two spaced portions of the bore of said tubular valve body and having clearance from said actuator between said contact portions and open at its end adjacent said enlarged body end portion to accommodate radial expansion thereof by liquid pressure to sealingly engage a portion of said valve body surrounding the mouth of said outlet passage in one operative rotative position of said actuator, said tube engaging a portion of said valve body remote from said outlet in another rotative position of said actuator,
   an annular sealing ring interposed between said second shoulder of said body and said enlarged circular portion of said actuator, and
   an annular resilient compressible seal member within said threaded body end portion in engagement with said first annular shoulder and engageable and compressible by an inlet pipe threaded in said body end portion.

2. A plumbing valve as defined in claim 1, wherein the free end of said eccentric part includes a lateral projection engaging the end of said resilient tube to retain the tube in operative position on said eccentric part.

3. A plumbing valve as defined in claim 1, wherein said actuator includes means for limiting radial expansion of said resilient tube in one direction incident to fluid pressure therein.

4. A plumbing valve as defined in claim 1, wherein said actuator includes a longitudinal part spaced from and extending alongside said eccentric part, a part of said resilient tube being positioned within the space between said last named actuator part and said eccentric part.

5. A plumbing valve as defined in claim 1, wherein said actuator includes a longitudinal part spaced from said eccentric part and cooperating therewith to confine a part of said resilient tube, said last named part including a tapered reinforcing section merging with said enlarged circular actuator portion.

6. A plumbing valve as defined in claim 1, wherein said actuator includes a longitudinal tube positioning part spaced from said eccentric part and terminating in a hook portion adapted for retaining engagement with the end of a portion of said tube confined between said eccentric part and said tube positioning part.

7. A plumbing valve as defined in claim 1, wherein said eccentric actuator part includes a lateral projection smaller than and axially aligned with said lateral outlet passage in the closed position of the valve to press said tube against said valve body around the mouth of said outlet.

* * * * *